United States Patent
Sim et al.

(10) Patent No.: US 7,324,792 B2
(45) Date of Patent: *Jan. 29, 2008

(54) APPARATUS AND METHOD FOR TRANSMITTING SIGNAL IN MOBILE COMMUNICATION SYSTEM

(75) Inventors: Dong Hi Sim, Seoul (KR); Bong Hoe Kim, Gyunggi-Do (KR)

(73) Assignee: LG Electronics Inc., Seoul (KR)

( * ) Notice: Subject to any disclaimer, the term of this patent is extended or adjusted under 35 U.S.C. 154(b) by 430 days.

This patent is subject to a terminal disclaimer.

(21) Appl. No.: 10/392,953

(22) Filed: Mar. 21, 2003

(65) Prior Publication Data

US 2003/0181171 A1    Sep. 25, 2003

(30) Foreign Application Priority Data

Mar. 21, 2002  (KR) .................. 10-2002-0015361

(51) Int. Cl.
  H04B 1/02   (2006.01)
  H04L 27/00  (2006.01)

(52) U.S. Cl. ............................... 455/101; 375/299

(58) Field of Classification Search .......... 455/101–103; 375/267, 347, 346, 299, 260, 146; 324/614
See application file for complete search history.

(56) References Cited

U.S. PATENT DOCUMENTS

| | | | | |
|---|---|---|---|---|
| 6,563,858 | B1* | 5/2003 | Fakatselis et al. | 375/148 |
| 6,889,355 | B1* | 5/2005 | Calderbank et al. | 714/792 |
| 2002/0034263 | A1* | 3/2002 | Schmidl et al. | 375/299 |
| 2002/0127978 | A1* | 9/2002 | Khatri | 455/103 |
| 2003/0043929 | A1* | 3/2003 | Sampath | 375/267 |
| 2003/0048753 | A1* | 3/2003 | Jalali | 370/252 |
| 2003/0123381 | A1* | 7/2003 | Zhuang et al. | 370/208 |
| 2003/0143962 | A1* | 7/2003 | Boariu | 455/106 |

(Continued)

FOREIGN PATENT DOCUMENTS

EP    0 711 056 A2    5/1996

(Continued)

OTHER PUBLICATIONS

Japanese Office Action dated Dec. 14, 2006 (w/English translation).

(Continued)

Primary Examiner—Duc M. Nguyen
Assistant Examiner—Michael Thier
(74) Attorney, Agent, or Firm—Ked & Associates, LLP

(57) ABSTRACT

A method for transmitting signal in a mobile communication system allocates symbols which will be transmitted to transmitting antennas appropriately as considering detection efficiencies of symbols on a higher order modulation constellation and correlation between antennas, and thereby independent symbol transmission can be made and independence between antennas can be improved to improve accuracy of symbol detection on a receiving end and signal transmitting function of the system can be improved. Therefore, a pair of symbols having the longest distance between symbols is arranged to a pair of antennas having higher correlation and a pair of symbols having the shortest distance between symbols is arranged to a pair of antennas having lower correlation. Also, symbols having higher detection efficiency are allocated to antennas having higher correlation and symbols having lower detection efficiency are allocated to antennas having lower correlation.

12 Claims, 8 Drawing Sheets

U.S. PATENT DOCUMENTS

2006/0023666 A1 * 2/2006 Jalali et al. .............. 370/334

FOREIGN PATENT DOCUMENTS

| EP | 1 117 197 A2 | 7/2001 |
| --- | --- | --- |
| EP | 1133080 | 9/2001 |
| JP | 03038933 | 5/1991 |
| JP | 9-83600 | 3/1997 |
| JP | 10-247955 | 9/1998 |
| JP | 11-094933 | 4/1999 |
| JP | 2001-237751 | 8/2001 |
| JP | P2001-345745 | 12/2001 |
| JP | 2002-124899 | 4/2002 |
| WO | WO 01/76110 A2 | 10/2001 |
| WO | WO 02/15433 A1 | 2/2002 |

OTHER PUBLICATIONS

Panasonic, "Enhanced HARQ Method with Signal Constellation Rearrangement" TSG-RAN Working Group 1 Meeting #19, TSGR1#19(01)0237, Feb. 27-Mar. 2, 2001, Las Vegas, NV, USA, pp. 1-11.

Choi et al., "Space-Time Block Codes Over Frequency Selective Rayleigh Fading Channels", VTC 1999, Sep. 22, 1999, vol. 5, United States, pp. 2541-2545.

EP Search Report dated May 9, 2005.

* cited by examiner

APPARATUS AND METHOD FOR TRANSMITTING SIGNAL IN MOBILE COMMUNICATION SYSTEM

BACKGROUND OF THE INVENTION

1. Field of the Invention

The present invention relates to a mobile communication system and, more particularly, to a signal transmission method and apparatus for a mobile communication system using a multiple antenna.

2. Description of the Background Art

Recently, with the rapid growth in the radio mobile communication markets, diverse multimedia services are in a great demand in the radio environment, and especially, as a transmit data is growingly increased and a data transmission speed becomes fast. Therefore, finding a way to efficiently use a limited frequency is the most critical task. In an effort to cope with the subject, a fresh transmission technique using multiple antennas is required for use, and one example of which is a multiple input multiple output (MIMO) system using the multiple antenna.

FIG. 1 illustrates one example of a general mobile communication system adopting a MIMO system.

As shown in FIG. 1, a conventional MIMO system includes: a plurality of transmitting antennas 12, a vector encoder 10 for transmitting sequentially generated transmit data (symbols) to each transmitting antenna 12; a plurality of receiving antennas 14; and a V-BLAST signal processor 16 for processing data received through the receiving antennas 14 in a V-BLAST (Vertical-Bell Labs Layered Space Time Architecture) method, and estimating and demodulating a transmit data.

The vector encoder 10 converts the sequentially generated transmit data in a serial-to-parallel method and transmits them to each transmitting antenna 12.

The V-BLAST METHOD is a sort of a transmission technique of a MIMO mobile communication system using multiple antennas, for which M number of transmitting antennas 12 and N number of receiving antennas 14 are used. FIG. 1 shows the case of using 4 transmitting antennas 12, but without being limited thereto, two or more antennas can be set arbitrarily.

The signal processing operation of the general MIMO mobile communication system constructed as described above will now be explained.

Without performing a certain signal processing for enhancing a transmission quality on the transmit data, the vector encoder 10 simply processes the transmit data a1–a4 in parallel and transmits them to each antenna 12. Then, each transmitting antenna 12 transmits each different transmit data in the air.

Data received through each receiving antenna 14 is inputted to the V-BLAST signal processor 16, and the V-BLAST signal processor 16 performs a signal processing suitably, that is, in a V-BLAST method, and detects the transmit data a1–a4.

The operation of the V-BLAST signal processor 16 will now be described in detail.

When the transmitting antenna 12 of the transmitting antenna array transmit a different transmit data (transmit symbol) to each other, the V-BLAST signal processor 16 receives the reception signals from each receiving antenna 14 of the receiving antenna array and constructs a reception data vector (receive vector). Subsequently, the V-BLAST signal processor 16 detects a transmission signal by using the receive vector.

In this respect, while the V-BLAST signal processor 16 detects the transmit symbol a specific transmitting antenna has transmitted, it regards transmit symbols other transmitting antennas 12 have transmitted as an interference signal.

Thus, the V-BLAST signal processor 16 calculates a weight vector of each receiving antenna 14 for each symbol transmitted from each transmitting antenna 12 and simultaneously subtracts the first detected symbol component from the receive vector, thereby estimating each symbol while minimizing influence of each symbol.

FIG. 2 is a flow chart of a method for estimating the transmit symbol by the V-BLAST signal processor 16.

First, the V-BLAST signal processor 16 constructs the signals received through each receiving antenna 14 as receive vectors (step S11).

For example, in case of a MIMO mobile communication system having M number of transmitting antennas 12 and N number of receiving antennas 14, assuming that a signal vector (transmit vector) transmitted through the M number of transmitting antennas 12 is 'a' and a matrix of a mobile communication channel (channel matrix) through which the transmit vector is transmitted is 'H', the receive vector (R) can be expressed by the following equation (1):

$$R = H \times a + v \qquad (1)$$

At this time, since the signals transmitted from the M number of transmitting antennas 12 are received through the N number of receiving antennas 16 through a different path, the channel matrix (H) can be expressed by N×M matrix. The channel matrix (H) is obtained through estimation by the V-BLAST signal processor 18. 'v' in equation (1) is a Gaussian noise, Since the noise is induced to each receiving antenna 14, 'v' is N×1 vector.

Consequently, the signals transmitted through the M number of transmitting antennas 12 pass through a different communication channel ($h_{i,j}$), and the V-BLAST signal processor 16 receives the signals through the N number of receiving antennas 14.

Upon receiving them, the V-BLAST signal processor 16 calculates each weight vector of the signals, and estimates symbols transmitted from each transmitting antenna 12 by using the calculated weight vector and the receive vector.

First, a method for calculating the weight vector will now be described.

In order for a receiving end to detect the symbols transmitted from the M number of transmitting antennas 12, signals received by the N number of receiving antennas are inner-producted by a weight vector which is defined as 'w'. Since different symbols are transmitted through the M number of transmitting antennas 12, the M number of weight vectors are required for the V-BLAST signal processor 18 to detect the transmit symbols. At this time, the weight vector (w) should satisfy the following condition.

$$w_i^H \times H_j = \begin{cases} 0 & (j \geq i) \\ 1 & (j = i) \end{cases} \qquad (2)$$

wherein '$H_j$' indicates a vector in the jth column of the channel matrix (H) which can be estimated by the V-BLAST signal processor 18.

In equation (2), the weight vector ($w_i$), which should be inner-producted to a corresponding receive vector so as for the ith transmitting antenna to detect a symbol transmitted from the antenna, has a property that it is '1' only when inner-producted to the ith column vector of the channel matrix (H) and '0' when inner-producted to the other remaining column vectors of the channel matrix (H).

That is, in the case of the weight vector (wi) for detecting the ith transmit symbol, influence of symbols transmitted through other transmitting antennas should be removed.

In addition, the transmit symbols are sequentially detected, and when the weight vector to be used for detecting a current symbol is obtained, since any influence of the previously detected symbols should be excluded, the expression 'j≧l' is used in equation (2).

Thus, the weight vector satisfying the quality of equation (2) can be obtained as follows: To begin with, the receive vector of equation (1) can be expressed by the following equation (3):

$$R = a_1 H_1 + a_2 H_2 + \ldots + a_M H_M \quad (3)$$

In general, symbols transmitted from each transmitting antenna 12 are received by the receiving end through each different channel, and equation (3) expresses the receive vector with the received symbols as a shape of a linear sum.

As noted in equation (3), when the first transmit symbol is detected, it is preferred that influence of second to Mth symbols is removed and the weight vector is then inner-producted to the receive vector. The same principle can be applied to the case of detecting other transmit symbols.

When a specific transmit symbol is detected, in order for a corresponding weight vector not to be influenced from other transmit symbols, the V-BLAST signal processor 16 updates the weight vector for every transmit symbol to be detected and uses it.

Once the receive vector (R) is constructed and the channel matrix (H) is estimated, the V-BLAST signal processor 16 starts updating a weight vector in order to obtain a weight vector for each transmit symbol to be detected.

For this purpose, as noted in the below equation (4), the V-BLAST signal processor 16 obtains a moore-penrose pseudoinverse matrix ($H^+$ or $G_1$) for the estimated channel matrix (H) (step S13).

$$G1 = H+ \quad (4)$$

After obtaining the Moore-Penrose pseudoinverse matrix, the V-BLAST signal processor 16 selects a row vector with the smallest vector norm value from row vectors of a G1 matrix, as a weight vector (step S15).

For instance, on the assumption that the selected row vector is the Kth row vector, the Kth line of the G1 matrix is selected as a weight vector ($w_K$) for detecting the Kth transmit symbol.

After the weight vector ($w_K$) is selected, the V-BLAST signal processor 16 inner-products the receive vector (r) and the weight vector ($w_K$) to estimate a symbol transmitted from the Kth transmitting antenna (step S17).

The receiving end, that is, the V-BLAST signal processor 16, is well aware of a modulation method (i.e., QPSK, QAM, etc.) used in a sending end of the MIMO mobile communication system. Thus, as the V-BLAST signal processor 18 is able to recognize which constellation the estimated symbol belongs to, it determines the estimated symbol as a transmit symbol (ak) transmitted form the Kth transmitting antenna.

The V-BLAST signal processor 18 checks whether the M number of transmit symbols transmitted from the M number of transmitting antennas 12 have been all detected (step S21). If there still remains transmit symbols to be detected, the V-BLAST signal processor 18 performs a procedure for updating the weight vector in order to detect the remaining transmit symbols.

First, when Kth symbol ($a_k$) is detected, as shown in the below equation (5), the V-BLAST signal processor 18 removes influence of the Kth symbol ($a_K H_K$) from the receive vector (r) of equation (3) to obtain a receive vector ($r_2$) to be used for the second updating (step S23).

$$r_2 = r - a_K H_K \quad (5)$$

After the receive vector ($r_1$) is obtained, the V-BALST signal processor 18 estimates a channel matrix ($H_2$) to be used to obtain $G_2$, that is, the second weight vector (step S25). Namely, the V-BLAST signal processor 16 deletes the column vector (Kth column) corresponding to the detected transmit symbol ($a_k$) from the previous channel matrix (H) and estimates a new channel matrix ($H_2$).

Subsequently, advancing to the step (S13), the V-BLAST signal processor 16 calculates the Moore-Penrose pseudo-inverse matrix of the estimated channel matrix ($H_2$) as shown in the below equation (6):

$$G2 = H_K^+ \quad (6)$$

The V-BLAST signal processor 18 selects a row vector with the smallest vector norm from row vectors of the $G_2$ matrix, as a weight vector (step S15). For instance, assumption that the selected row vector is the Vth row vector, the Vth line of the $G_2$ matrix is used as a weight vector ($w_V$) for detecting the Vth transmit symbol.

After the weight vector ($w_V$) is selected, the V-BLAST signal processor 16 inner-products the receive vector ($r_2$) and the weight vector ($w_V$) to estimate a symbol transmitted from the Vth transmitting antenna (step S17).

As stated above, the V-BLAST signal processor 18 is already aware of the digital modulation method used in the sending end of the MIMO mobile communication system, it can judge which constellation the estimated symbol belongs to, based on which the V-BLAST signal processor detects a symbol ($a_V$) transmitted from the Vth transmitting antenna. (step S19).

Thereafter, the V-BLAST signal processor 18 checks whether the M number of transmit symbols transmitted from the M number of transmitting antennas 12 have been all detected (step S21). If not all transmit symbols have been detected, the operations after the steps S23 and S25 are repeatedly performed. If all the transmit symbols have been detected, the steps are terminated.

As stated above, in the general MIMO mobile communication system, the transmit symbol is simply converted serial-to-parallel without being subjected to an additional signal processing, and then transmitted through the transmitting antennas. Then, the receiving end sequentially detects the transmit data each transmitting antenna has transmitted. At this time, the symbols transmitted independently from each transmitting antenna should maintain their independence while passing through the mobile communication channel.

However, actually some degree of correlation exists between the respective Tx antennas of the Tx antenna array and the correlation exists between the Rx antennas of the Rx antenna array, and therefore, the independence of the signals transmitted from the respective Tx antennas can not be ensured. Also, the mobile communication channel should ensure the independent channels between the respective Tx antennas and the respective Rx antennas, however, may not ensure the independent channels as many as the number of respective Tx antennas actually.

Therefore, the receiving end of the general MIMO mobile communication system has difficulty to detect the signal transmitted from a certain Tx antenna independently, and accordingly, an error may be generated and function of signal detecting is lowered, and thereby, the system function may be lowered.

SUMMARY OF THE INVENTION

Therefore, an object of the present invention is to provide an apparatus and a method for transmitting a symbol in a mobile communication system which is able to improve function of detecting symbols of a receiving end in a MIMO system.

Another object of the present invention is to provide an apparatus and a method for transmitting a symbol in a mobile communication system which allocates and transmits a symbol on Tx antenna after considering correlation between the Tx antennas.

Still another object of the present invention is to provide an apparatus and a method for transmitting a symbol in a mobile communication system which allocates and transmits symbols on Tx antenna as considering correlation between the Tx antennas and detection efficiency of the symbol.

Still another object of the present invention is to provide an apparatus and a method for transmitting a symbol in a communication system which re-allocates symbols on respective Tx antennas as considering correlation between the Tx antennas and/or a detection efficiency of the symbol in re-transmitting.

To achieve the object of the present invention, as embodied and broadly described herein, there is provided a method for arranging and transmitting symbols according to a correlation between transmitting (Tx) antennas and/or detection efficiency of symbols.

Desirably, a pair of symbols having the longest distance between symbols is arranged to a pair of antennas having higher correlation, and a pair of symbols having a shortest distance between symbols is arranged to a pair of antennas having lower correlation. In addition, the symbols having same distances therebetween are arranged to the pair of antennas having higher correlation and the pair of antennas having lower correlation evenly.

Desirably, the symbols having shortest distance therebetween are arranged to the pair of antennas having higher correlation, and a pair of symbols having the longest distance therebetween is arranged to the pair of antenna having lower correlation.

Desirably, the symbols having higher detection efficiency are allocated to the antenna having higher correlation, and the symbols having lower detection efficiencies are allocated to the antenna having lower correlation. In above case, symbols having higher detection efficiency are allocated to the pair of antennas having higher correlation as many as possible, and the symbols having lower detection efficiency are allocated to the pair of antennas having lower correlation as many as possible when the number of symbols allocated to the respective Tx antennas is different from each other.

The signal transmitting method in the mobile communication system according to the present invention arranges previously transmitted symbols according to correlation between Tx antennas and/or detection efficiency of the symbols and allocates the symbols to the respective Tx antennas.

Desirably, the pair of symbols having the shortest distance therebetween is allocated to the Tx antenna having higher correlation, and the pair of symbols having the longest distance therebetween is allocated to the Tx antenna having lower correlation.

A signal transmitting method in a mobile communication system using multiple antenna according to the present invention allocates a pair of symbols having long distance therebetween to a first pair of antennas having higher correlation, and allocates a pair of symbols having short distance therebetween to a second pair of antennas having lower correlation.

Desirably, the pairs of symbols having same distance between symbols are allocated to the first and second pair of antennas evenly.

Desirably, a pair of symbols having short distance between the symbols is allocated to the first pair of antennas and a pair of symbols having long distance between the symbols is allocated to the second pair of antennas in case that same symbols are re-transmitted.

A signal transmitting method in a mobile communication system using multiple antenna according to the present invention allocates a pair of symbols having short distance therebetween to a first pair of antennas having higher correlation, and allocates a pair of symbols having long distance therebetween to a second pair of antennas having lower correlation.

A signal transmitting method in a mobile transmission system using multiple antenna comprises a step of arranging symbols according to a correlation between transmitting(Tx) antennas and/or a detection efficiency of the symbols and a step of allocating and transmitting the arranged symbols to Tx antennas.

Desirably, a pair of symbols having the longest distance between symbols is allocated to a pair of antennas having higher correlation, and a pair of symbols having the shortest distance between symbols is allocated to a pair of antennas having lower correlation.

Desirably, the symbols having same distances therebetween are arranged on the pair of antennas having higher correlation and the pair of antennas having lower correlation evenly.

Desirably, the pair of symbols having the shortest distance between symbols are arranged on the pair of antennas having higher correlation, and the pair of symbols having the longest distance between symbols is arranged on the pair of antennas having lower correlation.

Desirably, the symbols having higher detection efficiencies are allocated to the antennas having higher correlation and the symbols having lower detection efficiencies are allocated to the antenna having lower correlation.

Desirably, the symbols having higher detection efficiency are allocated to the pair of antennas having higher correlation as many as possible, and the symbols having lower detection efficiency are allocated to the pair of antennas having lower correlation as many as possible in case that the number of symbols allocated to the respective Tx antennas are different from each other.

The signal transmitting method in a mobile communication system according to the present invention further comprises: a step of recognizing re-transmission request; and a step of re-arranging previously transmitted symbols according to the correlation of Tx antennas and/or detection efficiency of symbols when the re-transmission request is recognized and allocating the symbols on the Tx antennas.

Desirably, the pair of symbols having the shortest distance between symbols is allocated to the pair of antennas having higher correlation, and the pair of symbols having the longest distance between the symbols is allocated to the pair of antennas having lower correlation.

Desirably, the symbols having higher detection efficiency are allocated to the Tx antennas having higher correlation, and the symbols having lower detection efficiency are allocated to the Tx antennas having lower correlation.

To achieve the objects of the present invention, there is provided a signal transmitting apparatus in a mobile communication system using multiple antenna comprises a transmitting signal processor arranging symbols according to correlation between Tx antennas; and a demultiplexer allocating the arranged symbols to a plurality of Tx antennas.

The apparatus further comprises: a symbol detector for detecting Tx symbols by processing transmitted signal in a predetermined signal processing method; and a multiplexer for multiplexing the detected symbols.

Desirably, the transmitting signal processor arranges a pair of symbols having the longest distance between symbols to a pair of antennas having higher correlation, and allocates a pair of symbols having the shortest distance between symbols to a pair of antennas having lower correlation.

Desirably, the transmitting signal processor arranges the symbols of same distances therebetween to the pair of antennas having higher correlation and the pair of antennas having lower correlation evenly.

Desirably, the transmitting signal processor arranges the pair of symbols having the shortest distance between symbols to the pair of antennas having higher correlation, and arranges the pair of symbols having the longest distance between symbols to the pair of antennas having lower correlation.

Desirably, the transmitting signal processor arranges the symbols having higher detection efficiency on the antenna of higher correlation, and arranges the symbols having lower detection efficiency on the antennas of lower correlation.

Desirably, the transmitting signal processor arranges the symbols having lower detection efficiency on the pair of antennas having higher correlation as many as possible, and arranges the symbols having lower detection efficiency on the pair of antennas having lower correlation as many as possible when the numbers of symbols allocated to the respective Tx antennas are different from each other.

Desirably, the transmitting signal processor re-arranges the symbols according to the correlation between Tx antennas and/or the detection efficiency of the symbols in case that same symbols are re-transmitted.

Desirably, the transmitting signal processor re-arranges the pair of symbols having the shortest distance therebetween to the pair of antennas having higher correlation and re-arranges the pair of symbols having the longest distance therebetween to the pair of antennas having lower correlation.

Desirably, the transmitting signal processor re-arranges the symbols having higher detection efficiency on the Tx antennas having higher correlation, and re-arranges the symbols having lower detection efficiency on the Tx antennas having lower correlation.

Desirably, the predetermined signal processing method is a Zero-forcing method, a Minimum Mean Square Error (MMSE) method, and a V-BLAST method.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In an antenna array having a plurality of antennas, some degree of correlation is existed between neighboring antennas. As an example, in case that the number of antennas is four or more, independence can be ensured between both end antennas in the array, however, a large degree of correlation is existed between the neighboring antennas in the antenna array.

Therefore, in the present invention, Tx symbols are arranged on the respective antennas as considering the correlation between the antennas. Also, according to the present invention, the respective Tx symbols are arranged on the respective antennas as considering symbol detection efficiency.

However, in case of a system under Quadraphase shift keying (QPSK), the detection efficiencies of the symbols are same, and therefore, there is no advantage of considering the detection efficiency of the symbol as in the present invention. The above symbol allocating method considering the detection efficiency of the symbol is applied to the system higher than the 8PSK, and the correlation between the antenna and the symbol detection efficiency can be used in the system higher than the 8PSK.

Hereinafter, the most preferred embodiment of the present invention will be described with reference to accompanying Figures.

Figure 1:
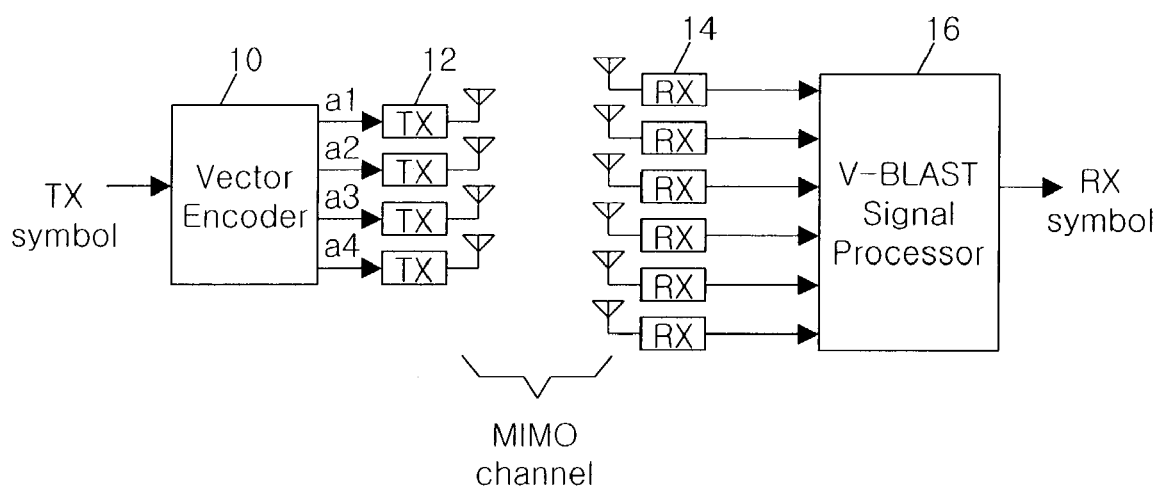
FIG. 1 is a view showing an example of a general MIMO mobile communication system configuration using multiple antenna.
Figure 2:
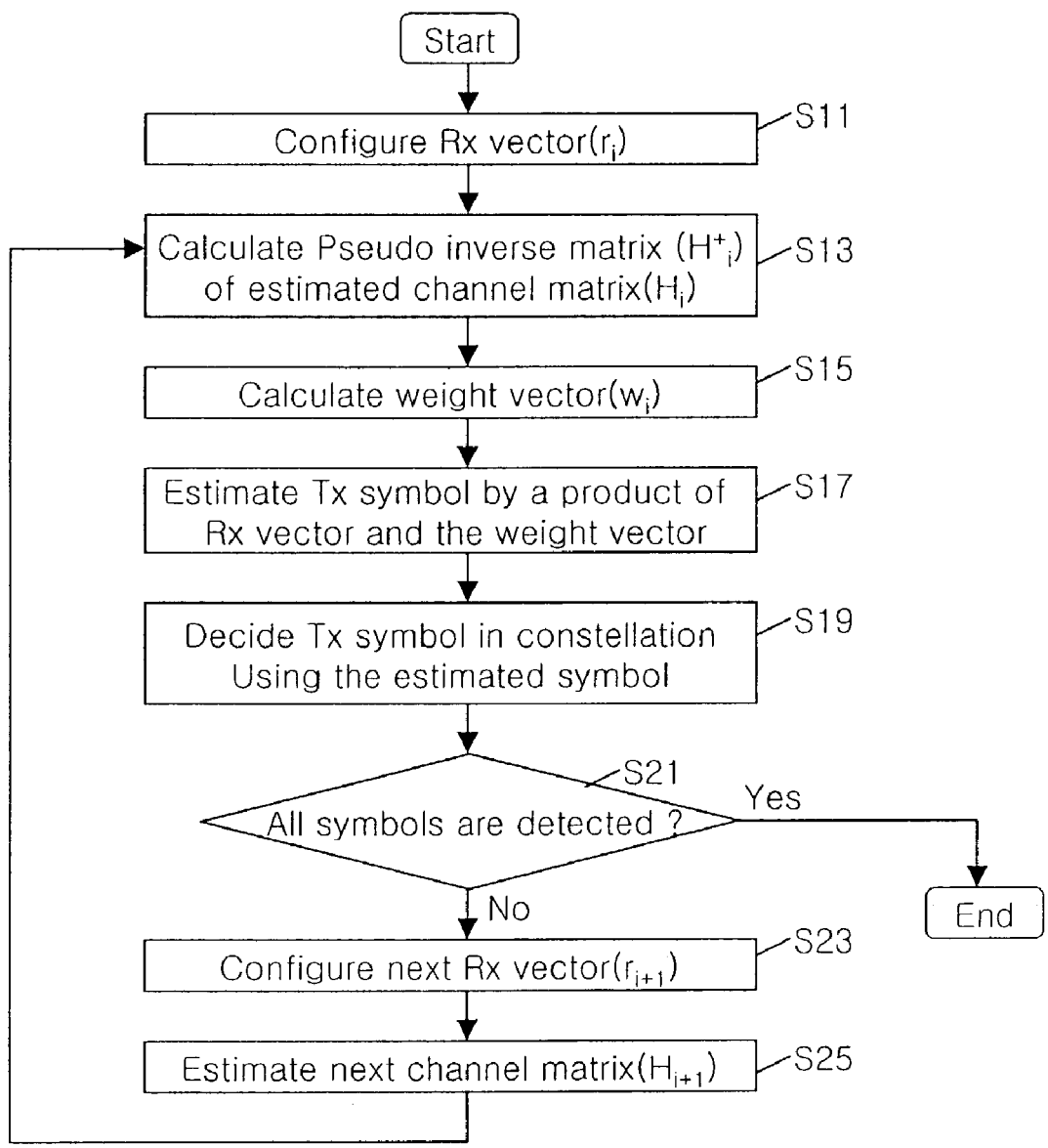
FIG. 2 is a view illustrating a general V-BLAST signal processing method.
Figure 3:
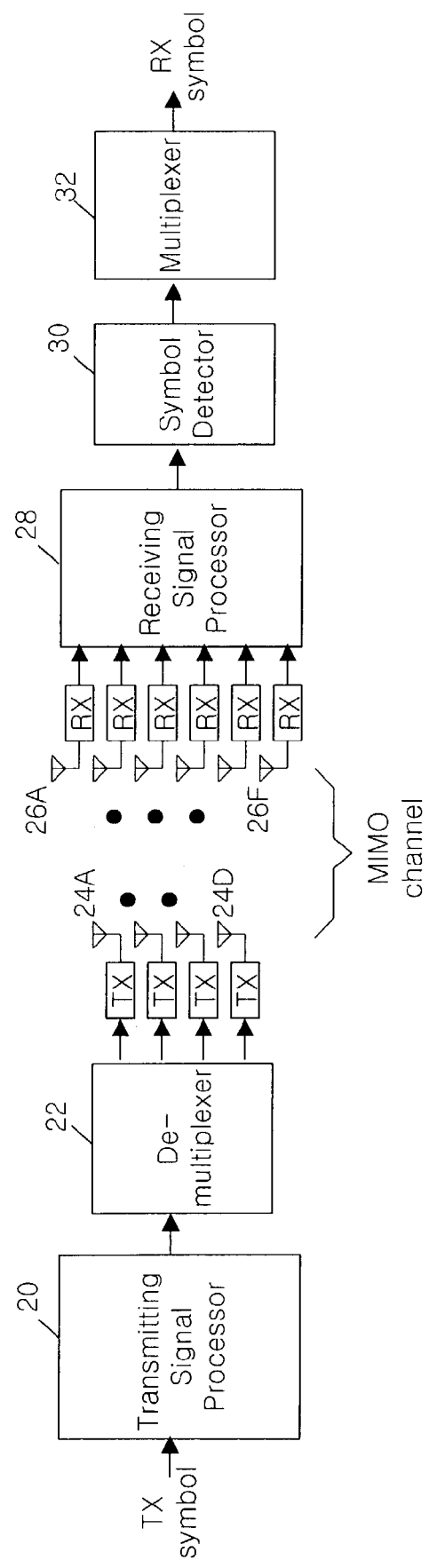
FIG. 3 is a view showing configuration of a signal transmitting apparatus in a mobile communication system using multiple antenna according to an embodiment of the present invention.

FIG. 3 shows a configuration of a signal transmitting apparatus in a mobile communication system using the multiple antenna according to the embodiment of the present invention.

The signal transmitting apparatus of the mobile communication system using the multiple antenna according to the embodiment of the present invention comprises: a plurality of Tx antennas 24A~24D; a transmitting signal processor 20 for arranging Tx symbols according to correlation of the Tx antennas 24 and/or symbol detection efficiency; a demultiplexer 22 for allocating the Tx. symbols which are outputted from the transmitting signal processor 20 to the respective Tx antennas 24 parallelly; a plurality of Rx antennas 26A-26F; a receiving signal processor 28 checking error of the signals received through the Rx antennas 26A-26F and requiring re-transmission; a symbol detector 30 processing signals outputted from the receiving signal processor 28 in a predetermined signal processing method to estimate/detect Tx symbols; and a multiplexer 32 for arranging the symbols detected in the symbol detector 30 in order of transmission by parallel-to-serial processing the estimated symbols.

The transmitting signal processor 20 and the receiving signal processor 28 include functions of hybrid automatic repeat request (ARQ), and the predetermined signal processing method comprises one of Zero-Forcing, Minimum Mean Square Error (MMSE) and V-BLAST methods.

The operation of the signal transmitting apparatus in the mobile communication system using multiple antenna according to an embodiment of the present invention will be described as follows.

When a symbol which will be trasnsmitted is inputted (S101), the transmitting signal processor 20 couples corresponding Tx symbols and a cyclic redundancy check (CRC) code (or forward error correction:FEC) code for controlling the error, and after that, arranges the symbols according to the correlation between the Tx antennas 24A~24D and/or the detection efficiencies of the symbols (S103).

Therefore, the demultiplexer 22 allocates the Tx symbols arranged by the transmitting signal processor 20 to respective Tx antennas 24, and thereby, the respective Tx antennas 24 transmit the corresponding symbols to receiving ends through MIMO channel (S105 and S107).

The receiving signal processor 28 of the receiving end checks whether or not an error is generated on the symbols received through the respective Rx antennas 26A-26F. If the states of the symbols are not good, the receiving signal processor 28 requires re-transmission of the symbol to the transmitting end.

When the re-transmission of the symbol is required from the receiving end (S109), the transmitting signal processor 20 of the transmitting end re-arranges the symbols required to be re-transmitted according to the correlation of the Tx antennas and/or the detection efficiency of the symbol, and after that, allocates the symbols to the respective Tx antennas 24 through the demultiplexer 22 to make the re-transmission (S111 and S113).

On the contrary, if the Rx symbols are in good states, the receiving signal processor 28 transmits the Rx signals to the symbol detector 30. The symbol detector 30 processes the received symbols in one of Zero-Forcing, Minimum Mean Square Error (MMSE), and V-BLAST methods to estimate/detect the Tx symbols, and the multiplexer 32 multiplexes the detected Tx symbols in order of transmission of the transmitting end and outputs them.

As described above, the transmitting signal processor 20 of the transmitting end allocates the respective symbols to the respective antennas considering the correlation between the Tx antennas and/or the detection efficiencies of the symbols when the Tx symbols are transmitted and re-transmitted, and the receiving signal processor 28 combines the transmitted (re-transmitted) symbols with the previously transmitted symbols to improve the receiving efficiency and accuracy of the symbol detection.

After that, the method of allocating the Tx symbols to the respective Tx antennas considering the correlation between the Tx antennas and/or the detection efficiencies of the symbols will be described in more detail as follows.

Figure 5:
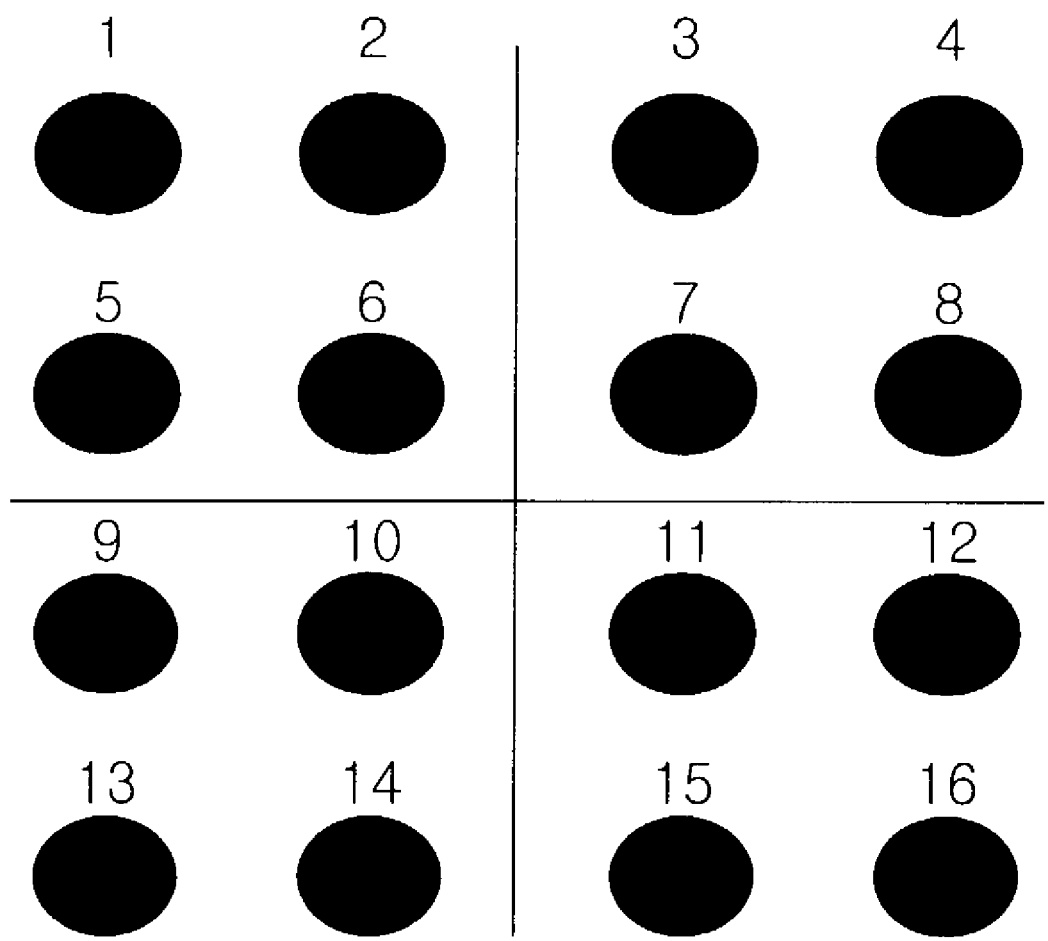
FIG. 5 is a view showing a 16 QAM (Quadrature Amplitude Modulation) constellation which is an example of higher order modulation constellation.

FIG. 5 is a higher order modulation constellation showing symbols of 16 QAM (Quadrature Amplitude Modulation).

Referring to FIG. 5, the symbols located on the outer side, that is, symbols 1, 4, 13 and 16 can be easily detected when comparing to the symbols located inside, for example, symbols 6, 7, 10 and 11, and therefore, stability for symbol detection on the receiving end can be ensured.

The present invention applies above property to the signal processing in the MIMO mobile communication system.

A symbol arranging method according to the first embodiment of the present invention arranges the Tx symbols according to the correlation between the Tx antennas.

In the first symbol arranging method, a pair of symbols farthest from a origin of the view in FIG. 5 is allocated to a pair of antennas having higher correlation with each other (pair of antennas which are located side by side, or near from each other), and a pair of symbols close to the origin of the view is allocated to a pair of antennas having lower correlation with each other (pair of antennas far from each other). Also, important symbols are arranged on the Tx antenna having lower correlation, and unimportant symbols may be arranged on the Tx antenna having lower correlation.

Figure 4:
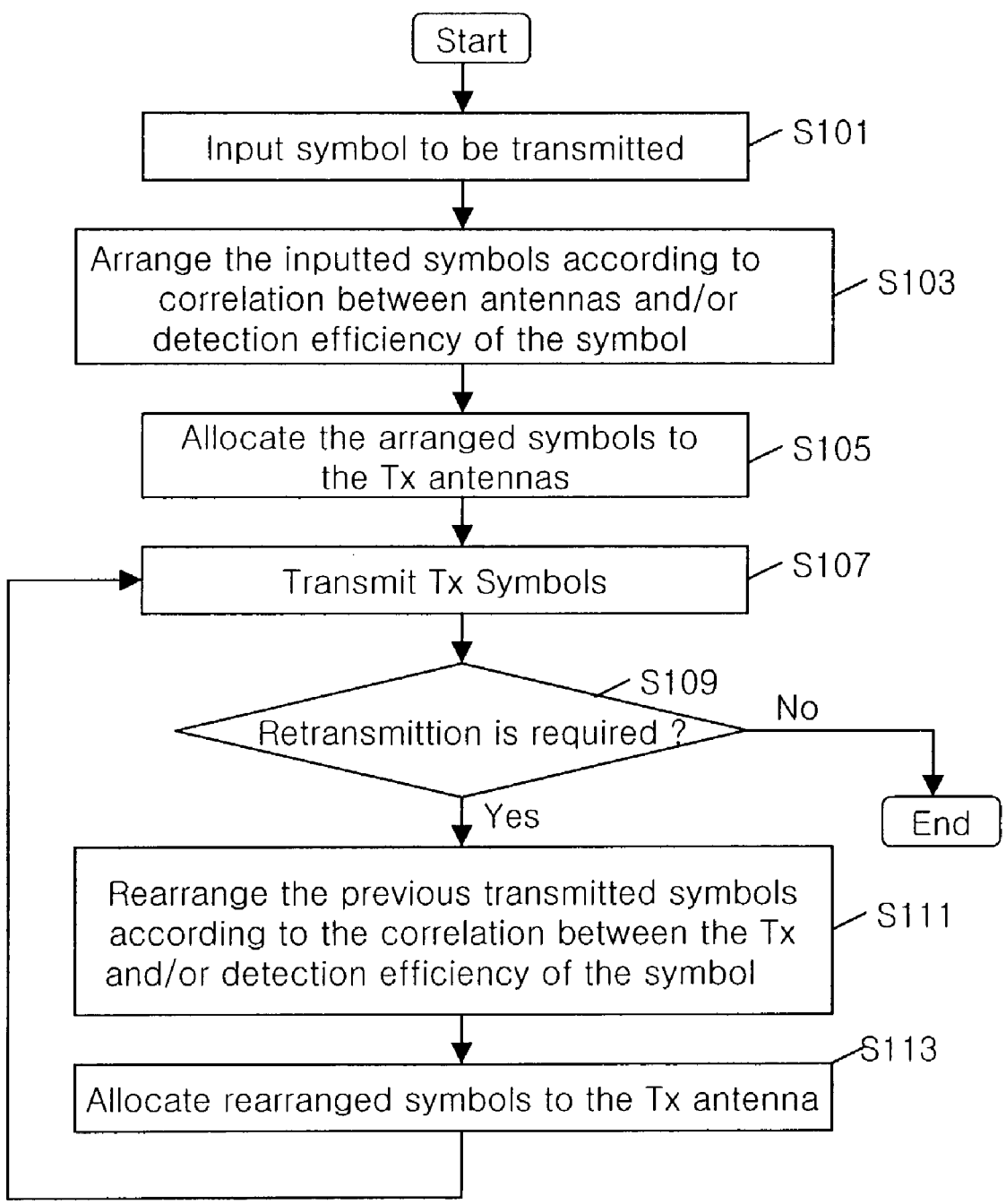
FIG. 4 is a flow chart illustrating a signal transmitting method in a mobile communication system according to an embodiment of the present invention.

That is, in case of an antenna array including four antennas (24A~24D), symbols 1, 4, 13 and 16 farthest from the origin in the 16 QAM symbol constellation in FIG. 4 are allocated to a pair of antennas 24B and 24C having higher correlation, and symbols 6, 7, 10 and 11 located inside (shortest distance from the origin) are allocated to the pair of antennas 24A and 24D having lower correlation. In addition, remained symbols 2, 3, 4, 8, 9, 12, 14 and 15 are allocated to the four antennas 24A~24D evenly since these are located on same distance from the origin.

Therefore, in case that the Tx symbols are arranged and transmitted according to the correlation between the Tx antennas using the first symbol arranging method, the symbol detection efficiency on the receiving end can be improved more than that of the case without considering the correlation between the antennas.

Also, as another symbol arranging method according to the embodiment of the present invention, the Tx symbols can be arranged as considering detection efficiencies of the symbols as well as the correlation between the Tx antennas. That is, the pair of symbols close to the origin of the constellation has lower detection efficiency, and the pair of symbols far from the origin of the constellation has higher detection efficiency, and therefore, the symbols can be arranged as considering above property.

In the second symbol arranging method, the pair of symbols (pair of symbols having lower detection efficiency) closest to the origin of the constellation is allocated to the pair of antennas having high correlation with each other, and the pair of symbols (pair of symbols having higher detection efficiency) is allocated to the pair of antennas having lower correlation with each other. Above method is for transmitting the symbols having higher detection efficiency firmly.

For example, in case of the antenna array comprising four antennas 24A~24D, the symbols farthest from the center point, that is, 1, 4, 13 and 16$^{th}$ symbols are allocated to the pair of antennas 24A and 24D having lower correlation in the 16 QAM constellation Figure of FIG. 5, and symbols 6, 7, 10 and 11 closest to the origin of the view are allocated to the pair of antennas 24B and 24C having higher correlation. In addition, remained symbols 2, 3, 5, 8, 9, 12, 14 and 15 are on same distance from the origin, and therefore, these are allocated to the respective four antennas 24A, 24B, 24C and 24D evenly.

Also, in case that the numbers of symbols which will be allocated to the respective Tx antennas, the symbols having higher detection efficiency may be allocated to the pair of antennas having higher correlation as many as possible, and the symbols having lower detection efficiency may be allocated to the pair of antennas having lower correlation as many as possible.

Therefore, in case that the second symbol arranging method is used, the symbol detection function on the receiving end can be improved higher than that of the case without considering the correlation between the antennas.

In addition, the present invention assumes a hybrid-ARQ system in which the transmitting end re-transmits same information in order to signal receiving efficiency on the receiving end. The transmitting end stores corresponding symbols when the receiving end receives the symbols first transmitted to the respective antennas, and then, re-allocates and transmits the symbols considering the correlation between the antennas in case that the same symbols are re-transmitted. The receiving end re-arranges the re-transmitted symbols in the predetermined order on the transmitting/receiving ends as the previously transmitted symbols, and after that, couples the previously received symbols and the re-transmitted symbols to improve the receiving efficiency. For example, in case of the system including four antennas, data symbols A, B, C and D are transmitted through the antennas 1, 2, 3 and 4 in the initial transmission, and same symbols are re-transmitted through the antennas 3, 4, 1 and 2 as considering the correlation between the antennas and the detection efficiency. In above case, the re-transmission is performed through the antenna having lower correlation, and thereby the number of re-transmission can be reduced and a throughput of the system can be improved.

Herein, the first and second symbol arranging methods are described, however, there may be a plurality of symbol arranging methods using the correlation of the antenna and/or the symbol detection efficiency.

FIGS. 6A and 6B and FIGS. 8A and 8B are examples of symbol alignments according to the symbol arranging method of the present invention. At that time, the Tx symbol is the symbol on the 16 QAM symbol constellation, and the Tx antennas are 24A, 24B, 24C and 24D.

Figure 6A:
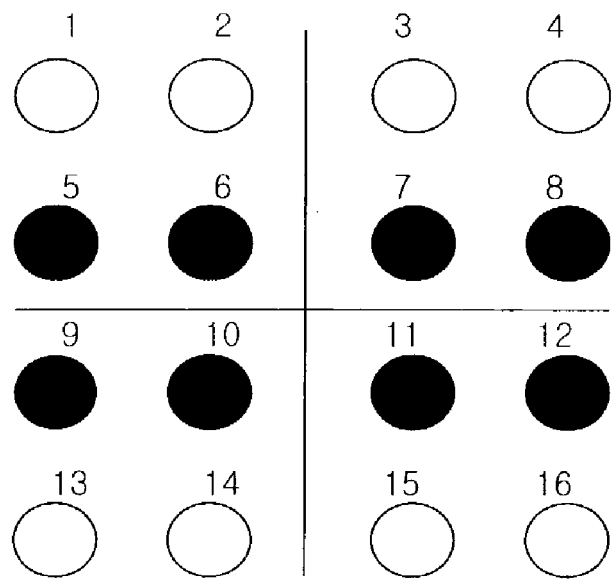
FIGS. 6A and 6B are views showing an example that symbols on the higher order modulation constellation are allocated to Tx antenna according to correlation between Tx antennas and detection efficiencies of symbols.
Figure 6B:
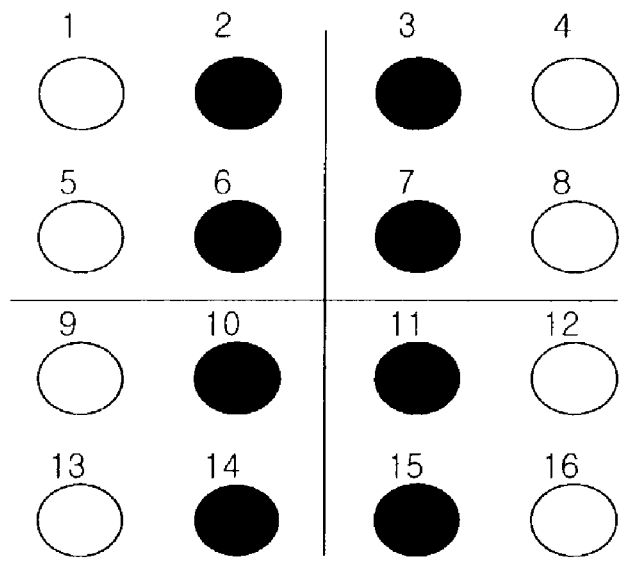
Figure 7A:
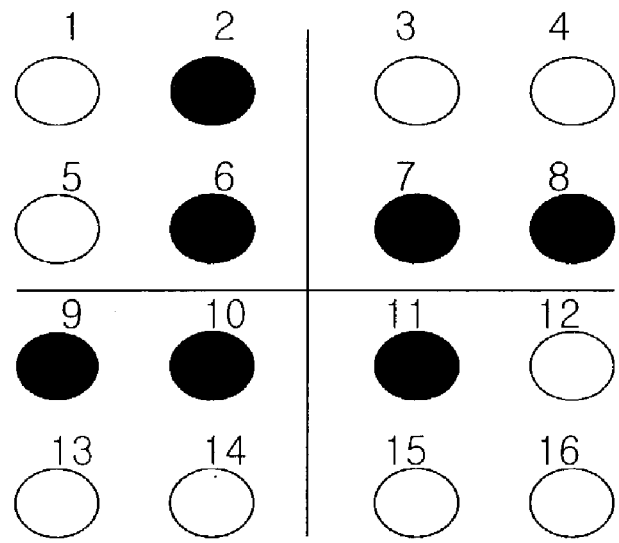
FIGS. 7A and 7B are views showing an example that symbols on the higher order modulation constellation are allocated to the Tx antenna according to the correlation between the Tx antennas and the detection efficiencies of the symbols.
Figure 7B:
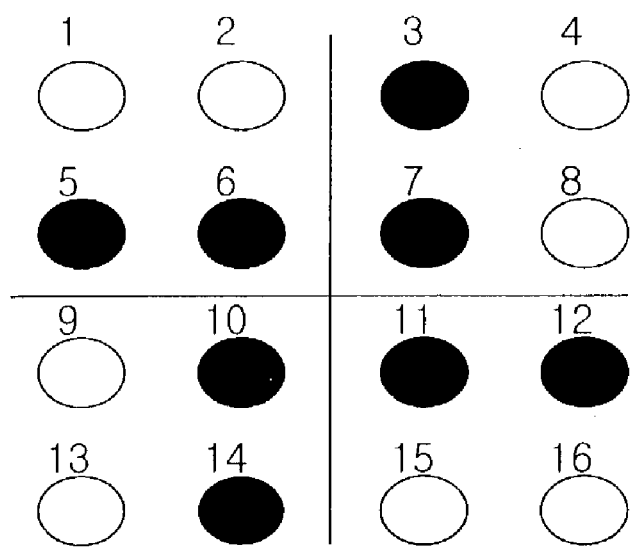
Figure 8A:
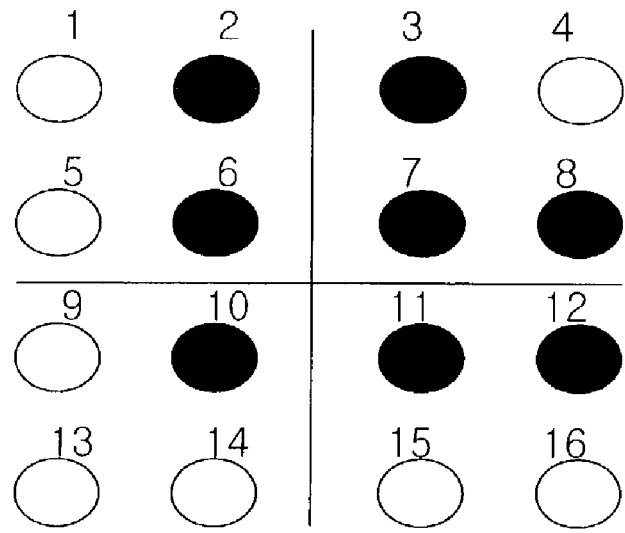
FIGS. 8A and 8B are views an example that symbols on the higher order modulation constellation are allocated to the Tx antenna according to the correlation between the Tx antennas and the detection efficiencies of the symbols.
Figure 8B:
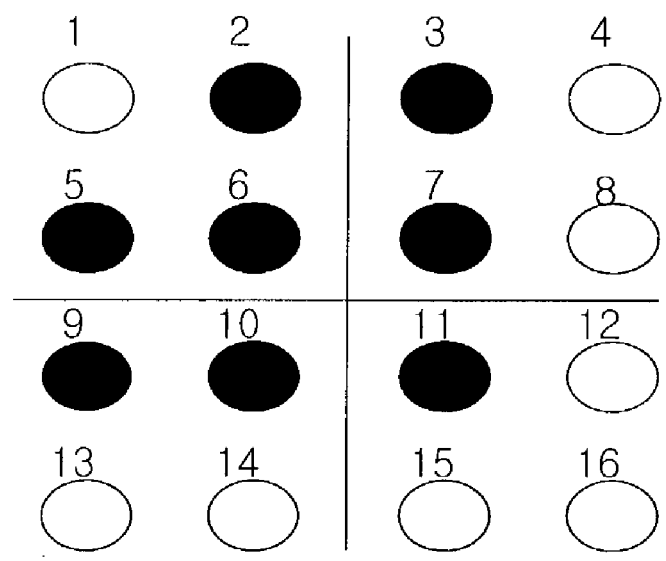

As shown in FIGS. 6A and 6B and in FIGS. 8A and 8B, in case that the first symbol arranging method is applied, black symbols are allocated to the antennas 24A and 24D, and white symbols are allocated to antennas 24B and 24C. That is, the symbols 1, 4, 13 and 16 which are farthest from the center and have higher detection efficiency are aligned to the antennas 24B and 24C, and the symbols 6, 7, 10 and 11 which are closest from the center and have lower detection efficiency are aligned to the antennas 24A and 24D.

In addition, there are many cases such as FIGS. 6A, 6B, 8A and 8B according to how the remained symbols (symbols 2, 3, 5, 8, 9, 12, 14 and 15) are aligned to the antenna pair (24B and 24C) and to the antenna pair (24A and 24D).

In addition, in the first symbol arranging method, in order to make the distance between the symbols aligned to the respective antennas as far as possible when the symbols 1, 4, 13 and 16 farthest from the origin of the constellation Figure are aligned to the Tx antennas 24B and 24C, the pair of symbols 1 and 16 and the pair of symbols 4 and 13 are divided and allocated. And if the pair of symbols 1 and 16 is aligned to the antenna 24B, the pair of symbols 4 and 13 can be set to be aligned to the antenna 24C, and the opposite alignment can be made.

In same principle as above, when the symbols 6, 7, 10 and 11 which are close to the center are aligned to the antennas 24A and 24D, the first symbol arranging method allocates the pair of symbols 6 and 11 and the pair of symbols 7 and 10 after dividing them. That is, the pair of symbols 7 and 10 can be allocated to the antenna 24D when the pair of symbols 6 and 11 is aligned to the antenna 24A, and the opposite alignment can be made.

Generally, if the transmitting end and the receiving end all use the plurality of antennas, the transmission speed of the data can be improved, and also, the communication quality can be improved, as well known. In a V-BLAST system which is a kind of system using the plurality of antennas in the transmitting/receiving ends, the independent signals are transmitted from the respective antennas of the transmitting end, as considering an ideal situation that the signals transmitted from the Tx antennas pass independent communication channels until the signals reaches to the antenna array of the receiving end.

However, in actual situation, the correlation between the antennas is existed, and therefore, the function is lowered when comparing to the ideal situation and it is difficult to expect the desired system function.

Therefore, according to the present invention, the symbols which will be transmitted are allocated to the antennas appropriately considering the detection efficiency of the symbols on the higher order modulation constellation and the correlation between the antennas to ensure the independent symbol transmission. Consequently, the independence of the antennas is improved, and therefore, the accuracy of symbol detection on the receiving end can be improved and the signal transmission function of the system can be improved.

Also, according to the present invention, the symbol is re-transmitted as considering the detection efficiency of the symbol and the correlation of the antennas in the system using the hybrid ARQ, and therefore, the communication quality can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A signal transmitting method in a mobile communication system which uses multiple transmitting antennas, comprising:

determining a correlation among the transmitting antennas;

determining a detection efficiency of each of a plurality of symbols, the detection efficiency for each symbol determined based on a position of the symbol relative to an origin point in a constellation pattern, said constellation pattern including multiple symbols located along one or more radial axes projecting from the origin point;

allocating the symbols to transmitting antennas according to the correlation among the transmitting antennas and according to the detection efficiency of each of the symbols, said allocating including:

allocating symbols with a first level of detection efficiency to respective ones of a first set of the transmitting antennas, and allocating symbols with at least a second level of detection efficiency to respective ones of a second set of the transmitting antennas, wherein the first and second sets of transmitting antennas have different degrees of correlation and wherein the symbols are allocated to achieve a desired symbol detection efficiency at a receiver; and transmitting the allocated symbols via the transmitting antennas.

2. The method of claim 1, further comprising:

detecting a re-transmission request; and re-arranging previously transmitted symbols according to the correlation among the transmitting antennas and according to the detection efficiency of the symbols when the re-transmission request is detected and allocating the re-arranged symbols on the transmitting antennas, wherein first symbols having a higher detection efficiency are re-arranged to first antennas having a first correlation and second symbols having a lower detection efficiency are re-arranged to second antennas having a second correlation lower than the first correlation during said allocating.

3. The method of claim 1, wherein symbols with relatively high detection efficiency are symbols located relatively far from an origin of a higher order modulation constellation, and symbols with relatively low detection efficiency are symbols located relatively close to the origin of the higher order modulation constellation.

4. The method of claim 3, wherein said allocating is performed by:

allocating symbols with relatively high detection efficiency to transmitting antennas with relatively high correlation.

5. The method of claim 3, wherein said allocating is performed by:

allocating symbols with relatively low detection efficiency to transmitting antennas with relatively low correlation.

6. The method of claim 3, wherein said allocating step is performed by:

allocating symbols with relatively high detection efficiency to transmitting antennas with relatively low correlation.

7. The method of claim 3, wherein said allocating step is performed by:

allocating symbols with relatively low detection efficiency to transmitting antennas with relatively high correlation.

8. The method of claim 1, wherein each of the first and second sets have one or more transmitting antennas.

9. The method of claim 1, wherein the symbols with the first level of detection efficiency are at different distances from the origin point in the constellation pattern than the symbols with the second level of detection efficiency.

10. A signal receiving method in a mobile communication system which uses multiple receiving antennas, comprising:

receiving signals from a transmitter, via the receiving antennas, containing symbols that have been allocated by the transmitter according to a correlation among transmitting antennas and according to a detection efficiency of the symbols, wherein:

symbols with a first level of detection efficiency have been allocated to respective ones of a first set of the transmitting antennas, and symbols with at least a second level of detection efficiency have been allocated to respective ones of a second set of the transmitting antennas, the first and second sets of transmitting antennas having different degrees of correlation; and processing the received signals by detecting the symbols contained therein and multiplexing the detected symbols.

11. A signal transmitting apparatus in a mobile communications system which uses multiple transmitting antennas, comprising:

a transmitting signal processor adapted to arrange symbols according to a correlation among the transmitting antennas and according to a detection efficiency of the symbols; and a demultiplexer adapted to allocate the arranged symbols to the transmitting antennas for transmission thereof, wherein the transmitting signal processor:

arranges symbols with a first level of detection efficiency to respective ones of a first set of the transmitting antennas, and arranges symbols with at least a second level of detection efficiency to respective ones of a second set of the transmitting antennas, wherein the first and second sets of transmitting antennas having different degrees of correlation and wherein the symbols are allocated to achieve a desired symbol detection efficiency at a receiver.

12. A signal receiving apparatus in a mobile communications system which uses multiple receiving antennas, comprising:

a receiving signal processor adapted to receive signals from a transmitter, via the receiving antennas, containing symbols that have been allocated by the transmitter according to a correlation among transmitting antennas and according to a detection efficiency of the symbols;

a symbol detector adapted to detect the symbols contained in the received signals; and a multiplexer adapted to multiplex the detected symbols, wherein:

symbols with a first level of detection efficiency have been allocated to respective ones of a first set of the transmitting antennas, and symbols with at least a second level of detection efficiency have been allocated to respective ones of a second set of the transmitting antennas, the first and second sets of transmitting antennas having different degrees of correlation.

* * * * *